April 21, 1942.  C. B. SPASE  2,280,357

HEAVY-DUTY CLUTCH

Filed Aug. 21, 1941  2 Sheets-Sheet 1

INVENTOR.
Charles B. Spase
BY
Rodell & Thompson
ATTORNEYS.

April 21, 1942.  C. B. SPASE  2,280,357
HEAVY-DUTY CLUTCH
Filed Aug. 21, 1941  2 Sheets-Sheet 2

INVENTOR.
Charles B. Spase
BY Bodell & Thompson
ATTORNEYS.

Patented Apr. 21, 1942

2,280,357

UNITED STATES PATENT OFFICE 2,280,357

HEAVY-DUTY CLUTCH

Charles B. Spase, Nedrow, N. Y., assignor to W. C. Lipe, Inc., Syracuse, N. Y., a corporation of New York Application August 21, 1941, Serial No. 407,784

12 Claims. (Cl. 192—69)

This invention relates to heavy-duty automotive clutches, and has for its object a self-contained clutch, that is, a clutch in which the driving member constitutes the fly wheel of the engine to which the engine is applied, and the entire clutch is applied to or assembled as a unit on the engine, and more specifically, has for its object a clutch in which the driven member is self-contained with the driving member and has a hollow portion having a bearing on a hub or applicator for mounting the driving member on the engine shaft and the driving member also has a hub in which the driven member or clutch shaft is journalled.

It further has for its object a self-contained clutch in which the clutch mechanism is mounted on the outside of a back plate which rotates with the driving member and includes a throw-out sleeve or collar slidable axially on the hub in which the clutch shaft is journalled, and motion transmitting means between it and the pressure ring of the clutch.

Other objects will appear throughout the specification.

The invention consists in the novel features and in the combinations and constructions hereinafter set forth and claimed.

In describing this invention, reference is had to the accompanying drawings in which like characters designate corresponding parts in all the views.

Figure 4 is a sectional view taken on lines 4—4, Figure 2.

Figure 5 is a fragmentary detail view showing the lost motion coupling between the two pressure rings.

Figure 6 is an elevation of parts seen in Figure 5.

Figure 1:
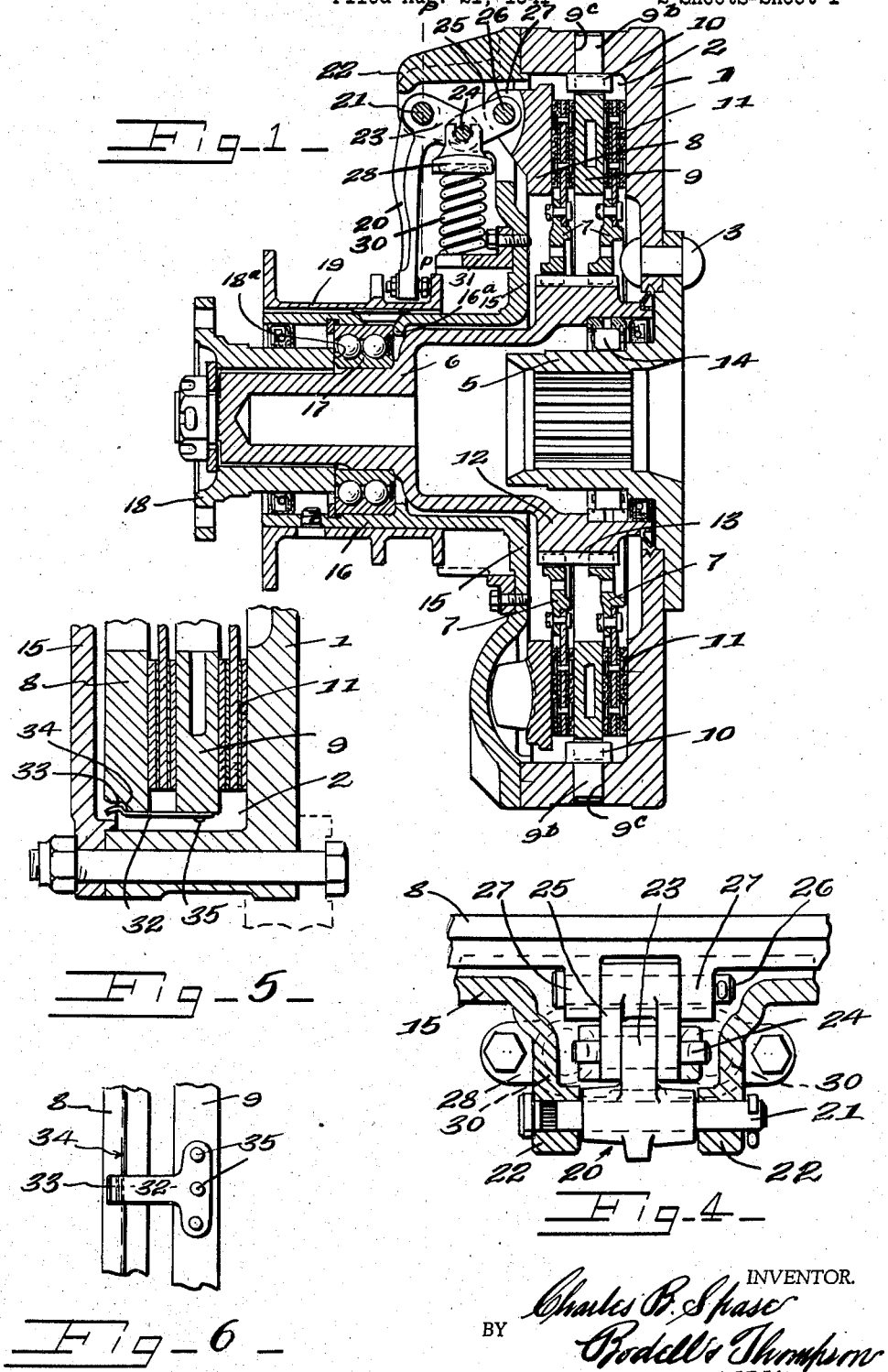
Figure 1 is a longitudinal sectional view of a clutch embodying this invention.
Figure 2:
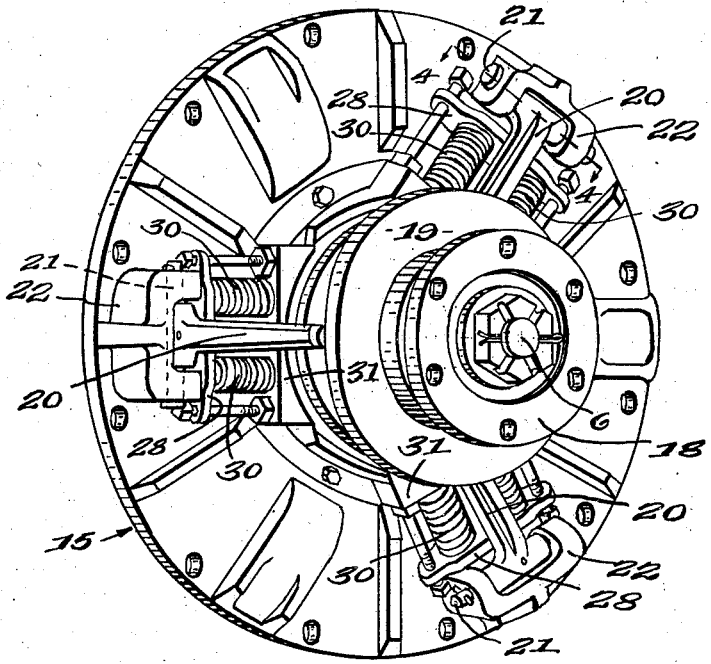
Figure 2 is a rear perspective view of the back plate and clutch mechanism thereon.
Figure 3:
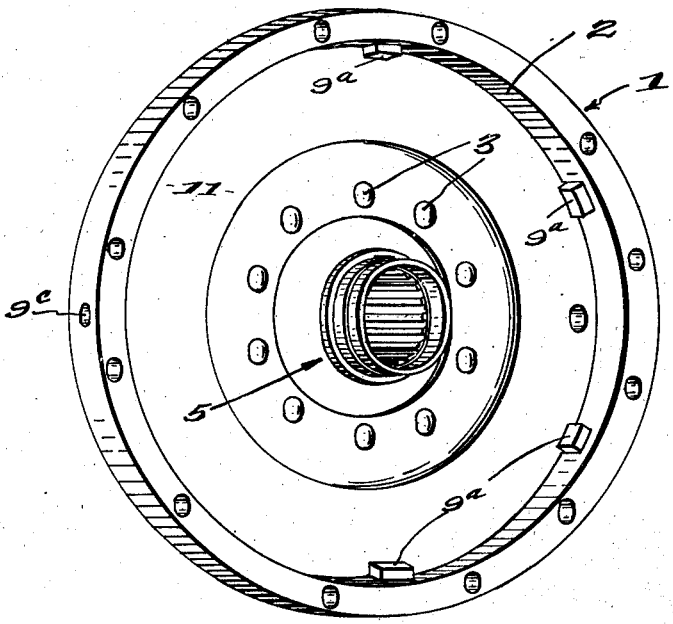
Figure 3 is a rear perspective view of the driving member of the clutch.

1 designates the driving member, this constituting the fly wheel of the engine and being formed with a cylindrical recess 2 in its rear side, the driving member being secured, as by rivets 3, to a flange 4 on an applicator hub 5 extending axially into the recess 2, this hub being for mounting on the end of the crank shaft of the engine to which the clutch is applied. The hub is formed with internal splines interfitting in external splines on the end of the crank shaft, not shown. The driven member of the clutch includes a clutch shaft 6, and one or more friction disks or plates 7 slidably mounted thereon in the recess 2. As here shown, the clutch is formed with two plates or friction disks 7. 8 designates a pressure ring coacting with the outermost plate or disk 7; 9 a second pressure ring rotatable with the driving member 1, and here shown as slidably interlocked at its periphery at 10 with the annular wall of the driving member 1, as by lugs 9a having stems 9b extending into holes 9c in the cylindrical wall of the recess, this being interleaved with the friction disks 7. The innermost friction disk 7 thrusts against the pressure face 11 at the bottom of the recess 2. The clutch shaft 6 has the hollow hub or head portion 12 which encloses the hub 5 and is spaced apart therefrom. The disks 7 are slidably splined at 13 on the hub 12. The hollow portion or hub 12 has a bearing on the periphery of the driving hub 5 and, as here shown, an antifriction bearing 14 is interposed between the hub 12 and the hub 5.

By the mounting just described including the bearing 14, the clutch, and also by another bearing to be described, the driving and driven members of the clutch are self-contained or can be assembled as a unit and applied to the engine, or the clutch is furnished complete by one manufacturer and delivered to the engine manufacturer or assembler of the machine in which the clutch is embodied. In other words, the clutch being selfcontained is accurately assembled by the clutch manufacturer, and this accuracy can not be upset by the engine and vehicle manufacturer even if the clutch is taken apart by the engine manufacturer in order to place a nut on the engine shaft against the inner end of the sleeve 5.

15 designates a back plate or cover for the recess 2 of the driving member, this being discoidal and secured to the rim or cylindrical wall of the driving member 1 and having a hub 16 enclosing the clutch shaft or driven member 6. An antifriction bearing 17 is interposed between the hub 16 and the rear portion of the clutch shaft 6, this bearing 17 being spaced axially from the bearing 14. Thus, the clutch shaft 6 has a bearing 14 on the periphery of the hub 5 and a bearing at 17 within the hub 16 of the back plate. In other words, the driven member or clutch shaft is entirely supported by the driving member. In the usual clutch construction, the outer or rear end of the clutch shaft has a bearing in a housing as the front wall of a gear box. 18 is a coupling for the propeller shaft, this being mounted on the rear end of the clutch shaft 6 and secured thereto in any suitable manner. The bearing 17 is held between the inner end of the coupling and thrusts against the same at 18ᵃ and an opposing internal annular shoulder 16ᵃ on the hub 16 of the back plate.

The clutch operating or throw-out mechanism includes a throw-out sleeve 19 slidable on the hub 16 and motion transmitting means between it and the pressure ring 8. The motion transmitting means includes a series of radially extending levers 20 pivoted at 21 at their outer ends to bosses or hoods 22 projecting from the rim of the back plate 15 on the outer side thereof. Each of these levers has an angular arm 23 forming one link of a toggle which is pivoted at 24 to the other toggle link 25, the link 25 being pivoted at 26 to lugs 27 on the rear or outer side of the pressure ring 8 and extending through suitable openings in the back plate 15. The links of the toggle are normally arranged folded radially inward from a line parallel to the axis of the clutch and passing through the pivots 21, 26, and straighten toward said line. Mounted on the joint 24 of the toggle is a spring seat 28, one for each lever 20. One or more clutch springs 30 are interposed between each spring seat 28 and additional spring seats 31 carried by the back plate 15 and located between the joint of the toggle and the hub 16. As here shown, this lever is acted upon by a pair of springs 30, which tend to straighten the toggle and engage the clutch.

The clutch is of the pull type, and when the throw-out collar 19 is pulled outwardly, the toggles are folded to a greater angle against the springs 30. Owing to the arrangement of the spring and the toggle links, the centrifugal force acts in conjunction with the springs and toggle links to engage the clutch. However, in order to facilitate the throwing out of the clutch, the levers 20, when the clutch is engaged, are so arranged relatively to a plane P normal to the axis of rotation, that the effect of the centrifugal force on the lever tends to oppose the action of the springs 30 and of the centrifugal force on the toggle links. In this pull type of clutch, the levers are arranged with the greater part of their bulk or weight to the rear of the plane P, that is, to the left in Figure 1. The throw-out collar is operated by any well known clutch or pedal mechanism.

In order to facilitate the disengagement of the clutch, the pressure rings 8, 9 are connected by a lost motion device, which permits first the withdrawal of the ring 8 during the throwing out operation and then the withdrawal of the ring 9. This device is shown as a plurality of tongues 32, each secured to the periphery of one ring and extending across the periphery of the other ring, and each having a shoulder 33 spaced from an annular shoulder 34 on the other ring. When the clutch is engaged, during the throw-out operation, the ring 8 is first withdrawn, taking up the lost motion between the shoulders 33, 34, so that during the latter period of the throw-out operation, the ring 9 is positively withdrawn. The tongues 32 are shown as secured at 35 to the ring 9.

What I claim is:

1. In a self-contained, heavy-duty clutch including driving and driven members, a pressure ring, the driven member including a friction plate extending between the pressure ring and the driving member, and mechanism for applying and releasing the pressure ring; the combination with a hub for sleeving on a drive shaft, the driving member being secured to the hub to rotate therewith, the driven member including a hollow portion journalled on the hub within the driving member, a back plate secured to the driving member and having a hub surrounding the driven member, and journal bearings between the last hub and the driven member axially spaced from the bearing between the hollow portion of the driven member and the first hub.

2. In a self-contained, heavy-duty clutch including driving and driven members, a pressure ring, the driven member including a friction plate extending between the pressure ring and the driving member, and mechanism for applying and releasing the pressure ring; the combination with a hub for sleeving on a drive shaft, the driving member being secured to the hub to rotate therewith, the driven member including a hollow portion journalled on the hub, a back plate secured to the driving member and having a hub surrounding the driven member, and a journal bearing between the last hub and the driven member axially spaced from the bearing between the hollow portion of the driven member and the first hub, the clutch mechanism including parts mounted on the back plate on the outer side thereof, a throw-out sleeve slidable axially on the second hub, and motion transmitting means between the sleeve and said parts.

3. In a self-contained, heavy-duty clutch including driving and driven members, the driving member being formed with an annular recess opening through its rear face, a pressure ring within the recess, the driven member including a friction plate in the recess between the pressure ring and the driving member, and mechanism for applying and releasing the pressure ring; the combination with a hub for sleeving on a drive shaft, the driving member being secured to the hub to rotate therewith, the driven member including a shaft having a hollow head portion enclosing and journalled on the hub, a back plate secured to the driving member and forming a cover for the recess, the back plate having a hub surrounding the driven member, a journal bearing between the last hub and the driven member axially spaced from the bearing between the hollow head portion of the driven member and the first hub, a throw-out sleeve slidable on the hub of the back plate, radially extending levers pivoted to the back plate and coacting at their inner ends with the throw-out sleeve, toggle mechanism including links, one rigid with the adjacent lever and the other pivoted to the pressure ring, the toggles folding radially inward, spring seats carried by the back plate on the rear side thereof and radially inward from the toggles, and springs between the spring seats and the toggles tending to thrust the joints of the toggles radially outward.

4. In a self-contained, heavy-duty clutch including driving and driven members, the driving member being formed with an annular recess opening through its rear face, a pressure ring within the recess, the driven member including a friction plate in the recess between the pressure ring and the driving member, and mechanism for applying and releasing the pressure ring; the combination with a hub for sleeving on a drive shaft, the driving member being secured to the hub to rotate therewith, the driven member including a shaft having a hollow head portion enclosing and journalled on the hub, a back plate secured to the driving member and forming a cover for the recess, the back plate having a hub surrounding the driven member, a journal bearing between the last hub and the driven member axially spaced from the bearing between the hollow head portion of the driven member and the first hub, a throw-out sleeve slidable on the hub of the back plate, radially extending levers pivoted to the back plate and coacting at their inner ends with the throw-out sleeve, toggle mechanism including links, one rigid with the adjacent lever and the other pivoted to the pressure ring, the toggles folding radially inward, spring seats carried by the back plate on the rear side thereof and radially inward from the toggles, and springs between the spring seats and the toggles tending to thrust the joints of the toggles radially outward, the levers being arranged with the greater part of their weight to the rear of the plane and at a right angle to the axis of the driven member and passing through the pivotal connection of the lever to the back plate.

5. A self-contained, heavy-duty clutch including driving and driven members, the driving member being formed with a recess opening through its rear face, a pressure ring within the recess, the driven member including a friction plate extending between the pressure ring and the bottom of said recess, a back plate secured to the driving member and forming a cover for the recess and having a rearwardly extending hub around the driven member, the back plate having an opening therein and the pressure ring having lugs projecting through said opening, the driven member including a shaft supported by the driving member in alinement therewith and the back plate having a bearing on the shaft, the back plate also having rearwardly projecting bosses, a throw-out sleeve slidable on the hub of the back plate, radially extending levers pivoted at their outer ends to said bosses and coacting at their inner ends with the throw-out sleeve, toggle mechanism between the levers and the said lugs and located in said bosses, the toggle mechanism being normally folded radially inward and movable outwardly toward the straight line of the toggle, and clutch springs arranged radially inward from the bosses and thrusting outwardly on the toggles tending to straighten the same.

6. In a self-contained, heavy-duty clutch including driving and driven members, the driving member being formed with an annular recess opening through its rear face, a pressure ring in the recess, the driven member including a friction plate located in the recess and extending between the pressure ring and the driving member, and mechanism for applying and releasing the pressure ring; the combination with a hub for sleeving on a drive shaft, the hub extending axially into the recess, the driving member being secured to the hub to rotate therewith, the driven member including a shaft having a hollow head portion journalled on said hub, the friction plate interlocking with the periphery of said head, a back plate forming a cover for the recess and having a hub surrounding the driven shaft and journalled thereon, the back plate also having openings therethrough and the pressure ring having lugs extending through said openings, the back plate also being provided with rearwardly extending bosses on the rim thereof, a throw-out sleeve slidable axially on the hub of the back plate, levers pivoted to said bosses extending radially inward and coacting at their inner ends with the throw-out sleeve, toggle links within the bosses pivoted together at like ends and their other ends being rigid with the levers and pivoted to said lugs respectively, the back plate also having spring seats located inwardly relatively to the pivotal joint of the toggle, and springs interposed between the spring seats and the joints of the toggles.

7. In a self-contained, heavy-duty clutch including driving and driven members, the driving member being forced with an annular recess opening through its rear face, a pressure ring in the recess, the driven member including a friction plate located in the recess and extending between the pressure ring and the driving member, and mechanism for applying and releasing the pressure ring; the combination with a hub for sleeving on a drive shaft, the hub extending axially into the recess, the driving member being secured to the hub to rotate therewith, the driven member including a shaft having a hollow head portion journalled on said hub, the friction plate interlocking with the periphery of said head, a back plate forming a cover for the recess and having a hub surrounding the driven shaft and journalled thereon, the back plate also having openings therethrough and the pressure ring having lugs extending through said openings, the back plate also being provided with rearwardly extending bosses on the rim thereof, a throw-out sleeve slidable axially on the hub of the back plate, levers pivoted to said bosses extending radially inward and coacting at their inner ends with the throw-out sleeve, toggle links within the bosses pivoted together at like ends and their other ends being rigid with the levers and pivoted to said lugs respectively, the back plate also having spring seats located inwardly relatively to the pivotal joint of the toggle, and springs interposed between the spring seats and the joints of the toggles, the levers being arranged with the greater part of their weight to the rear of the plane at a right angle to the axis of the driven shaft and passing through the pivot of the lever.

8. In a self-contained, heavy-duty clutch including driving and driven members, a pressure ring, the driven member including a friction plate extending between the pressure ring and the driving member, and mechanism for applying and releasing the pressure ring; the combination with a hub for sleeving on a drive shaft, the driving member being secured to the hub to rotate therewith, the driven member including a hollow head portion encircling the hub and journalled thereon, a back plate secured to the driving member and having a hub surrounding the driven member, an antifriction bearing between the last hub and the driven member, a throw-out sleeve surrounding the last hub and motion transmitting means carried by the back plate between the throw-out sleeve and the pressure ring, a coupling mounted on the outer end of the driven member and extending within the hub of the back plate, said coupling having a shoulder at its inner end opposed to an annular shoulder on the hub of the back plate and the antifriction bearing being interposed between said shoulders and taking the thrust thereof.

9. In a clutch including driving and driven members, the driven member including a plurality of friction plates mounted to have a relative sliding axial movement, a pressure ring interposed between the friction plates and a second pressure ring coacting with the outermost friction plate, clutch operating mechanism for applying pressure to and releasing the same from the second pressure ring, and means for successively releasing the pressure rings when the clutch operating mechanism is operated to disengage the clutch, said means comprising a tongue secured to the periphery of one of the pressure rings and extending across the periphery of the other, the tongue and the latter ring having shoulders which are spaced apart when the clutch is engaged, and which are brought into engagement upon operation of the operating mechanism to release the clutch.

10. In a friction clutch including driving and driven members, a pressure ring opposed to the driving member and rotatable therewith, the driven member including a clutch shaft and a friction plate rotatable therewith and extending between the pressure ring and the driving member, and a back plate rotatable with the driving member; the combination of clutch operating mechanism including a throw-out collar shiftable axially relatively to the shaft, toggle links pivoted together at like ends and at their other ends, respectively, to the back plate and to the pressure ring, the toggle links being foldable radially inward toward the axis of the clutch, the pivotal joint of the toggle being movable outward toward a center line passing through the pivotal points of the links to the back plate and to the pressure ring, a spring acting radially on the toggle links and tending to straighten the toggle, and radially extending levers coacting at their inner ends with the throw-out collar, the toggle links which are pivoted to the back plate being angular to the levers at the outer ends of the levers and rigid therewith.

11. In a self-contained friction clutch including driving and driven members, a pressure ring, the driven member including a friction plate extending between the pressure ring and the driving member and a clutch shaft arranged in axial alinement with the driving member, and mechanism for applying and releasing the pressure ring; the combination of an axial hub to which the driving member is secured, and a second hub forming part of the driving member as a whole and axially spaced rearwardly from the former hub, the clutch shaft having spaced apart bearings on and in said hubs respectively.

12. In a self-contained friction clutch including driving and driven members, a pressure ring, the driven member including a friction plate extending between the pressure ring and the driving member and a clutch shaft arranged in axial alinement with the driving member, and mechanism for applying and releasing the pressure ring; the combination of an axial hub to which the driving member is secured, and a second hub forming part of the driving member as a whole and axially spaced rearwardly from the former hub, the clutch shaft having spaced apart bearings on and in said hubs respectively, said mechanism for applying and releasing the pressure ring including a throw-out sleeve slidable axially of the second hub, and motion transmitting means between it and the pressure ring.

CHARLES B. SPASE.